J. M. STEPHENSON.
Wheel for Vehicles.

No. 159,049.

Patented Jan. 26, 1875.

Witnesses;

Inventor.
James M. Stephenson

UNITED STATES PATENT OFFICE.

JAMES M. STEPHENSON, OF PENDLETON, INDIANA.

IMPROVEMENT IN WHEELS FOR VEHICLES.

Specification forming part of Letters Patent No. 159,049, dated January 26, 1875; application filed July 30, 1874.

*To all whom it may concern:*

Be it known that I, JAMES M. STEPHENSON, of Pendleton, Madison county, Indiana, have invented a Hub for Tightening Spokes and Tires, of which the following is a specification:

The object of my invention is to construct a box with two inclined planes or cones for the spokes to abut against, in such a manner that the two hubs, when placed one on each end of the box, with a rubber cushion between them, have an inclined plane or cone in each of them, on which the ends of the spokes abut, for the purpose of expanding the fellies and tightening the tires, or dishing the wheels, as the two hubs are forced together by means of the nuts and lock-nut bands.

Figure 1:
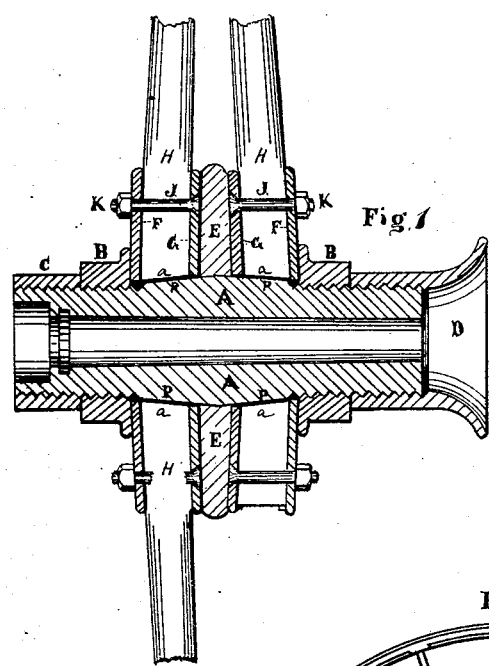

Figure 1 represents a sectional view of my improved hub, in which A represents the box. This box is provided with two cones, P P, the highest point being at the center of the box, and tapering gradually toward each end. The ends of the box A are provided with screw-threads, and these screws are cut from each end to the small end of the cones P P, for the purpose of screwing the nuts B B and bands C D on the box, as represented in Fig. 1.

Figure 2:
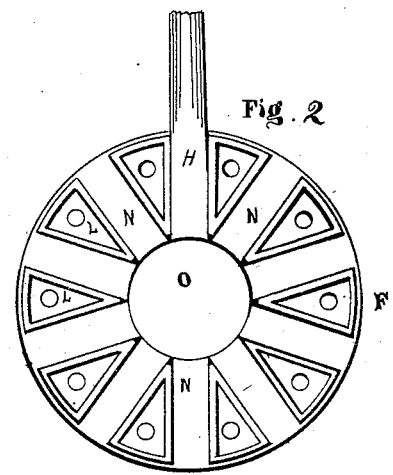

Fig. 2 represents the case or hub F, and is made of any suitable material, and is provided with sockets N N as receptacles for the ends of the spokes H H. Between these sockets are a series of lugs, which form the side bearings of the spokes, and in the center of each of these lugs are holes L L, into which the bolts J J are inserted; then the cap G is placed on, and the spokes are held fast between the hub-socket and cap by means of the bolts J J and nuts K K. Each of the hub-sections F F are then placed on the box A, with a rubber cushion, E, between them. The ends of each of the spokes resting on the cones P P of the box A, by screwing the nuts B B up against the sides of the hubs F F, the spokes H H will be forced outward by the cones P P, and press against the fellies and tire, and the wheel will become perfectly stiff, with the tire tight. Outside of the nuts B B the bands C D are then screwed, and act as nut-locks, as well as make a finish to the hub.

If it is required to have more or less dish given to the wheel, all that is necessary is to slack one of the nuts B and tighten upon the other.

Figure 3:
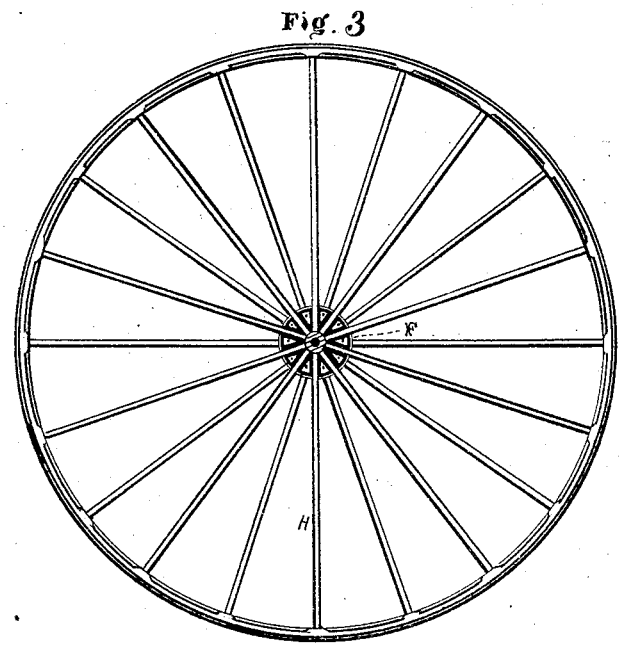

Fig. 3 represents a wheel complete, with the hub shown in section, showing the ends of the spokes against the cones P P.

I do not broadly claim the expanding of the fellies by forcing them up an inclined plane; neither do I broadly claim a single inclined plane for the ends of the spokes to rest against, as they are old.

What I claim as new, and wish to secure by Letters Patent, is—

1. The box A, provided with a screw at each end for the nuts B B, and with the cones P P and bands C D, in combination with spokes H H, substantially as specified.

2. The rubber cushion E, in combination with the two hub-sections F F, substantially as specified.

3. The combination of the two hub-sections F F and box A, having cones P P to dish the wheel more or less, and to tighten the fellies, substantially as specified.

In testimony whereof I have signed my name to this specification in the presence of two subscribing witnesses.

JAMES M. STEPHENSON.

Witnesses:
JOHN W. COONS,
C. H. COONS.